United States Patent [19]

Lemaire et al.

[11] Patent Number: 4,897,538
[45] Date of Patent: Jan. 30, 1990

[54] LIGHT PULSE DETECTING SYSTEM WITH HIGHLY REDUCED FALSE ALARM RATE, USABLE FOR LASER DETECTION

[75] Inventors: Jean M. Lemaire, Rueil Malmaison; Alain Belissant, Sevres; Jean P. Fauchard, Les Ulis, all of France

[73] Assignee: Thomson CSF, Paris, France

[21] Appl. No.: 222,661

[22] Filed: Jul. 21, 1988

[30] Foreign Application Priority Data

Jul. 31, 1987 [FR] France ............................... 87 10874

[51] Int. Cl.⁴ ............................................. H01J 40/14
[52] U.S. Cl. ................................. 250/209; 250/214 B
[58] Field of Search ............ 250/208, 209, 578, 203 R, 250/214 RL, 554, 339, 214 B; 356/1, 4, 141, 152

[56] References Cited

U.S. PATENT DOCUMENTS 3,801,821 4/1974 Sharpe et al. ....................... 250/209
4,004,852 1/1977 Pentecost ............................ 250/578
4,028,544 6/1977 Jourdan ............................ 250/203 R

FOREIGN PATENT DOCUMENTS 1048523 11/1966 United Kingdom .
2122833 1/1984 United Kingdom .
WO82/03146 9/1982 World Int. Prop. O. .

OTHER PUBLICATIONS

Patent Abstracts of Japan, vol. 5, No. 191 (P-92) (863), Dec. 5, 1981; and JP-A-56 115 925 (Matsushita Denki Sangyo K.K.) 11-09-1981.

Primary Examiner—David C. Nelms
Assistant Examiner—William L. Oen
Attorney, Agent, or Firm—Cushman, Darby & Cushman

[57] ABSTRACT

The system enables the lowering of the false alarm rate by eliminating, in particular, the spurious pulses created by the detectors themselves. To this effect, it has one or more juxtaposed optical channels to cover the total field. Each optical channel is associated with a pair of detecting elements to form two detecting channels. After amplification and threshold comparison in these channels, the correlation of the two channels is produced to eliminate the spurious signals and select only the useful signal which is simultaneously present on both channels.

14 Claims, 5 Drawing Sheets

LIGHT PULSE DETECTING SYSTEM WITH HIGHLY REDUCED FALSE ALARM RATE, USABLE FOR LASER DETECTION

BACKGROUND OF THE INVENTION

1. Field of the Invention

The present invention concerns a system for the detection of light pulses, especially pulses emitted by a laser, with a notably low false alarm rate.

By light pulses we mean pulses with wavelengths in both the visible spectrum and the invisible spectrum, especially in the near infrared and far infrared range, for example, for laser radiation at 1.06 microns and 10.6 microns.

The false alarm rate is reduced by making the detecting system insensitive to spurious signals and, especially, to the electrical pulses created by the photodetectors themselves when there is no source of irradiating optical energy.

This result is got, according to the invention, by an arrangement of the optronic detection channels, through the parallel mounting, for each channel, of two photodetectors coupled to one and the same optical channel. Then, by correlation, a specific analog (or digital) processing of the detected pulses enables the detection and validation of the light pulses received and the rejection of the internal spurious pulses regardless of their width, amplitude and repetition characteristic.

According to an application more particularly envisaged, the invention concerns the detection of laser pulses and enables the making of equipment which can perform the function of a laser warning detector.

2. Description of the Prior Art

The frequent use of laser illuminators in weapon systems for telemetry or target designation has made it necessary to envisage efficient protection of the carriers (armored vehicles, ships or aircraft). This protection consists firstly in alerting the crew to the presence of a laser threat so as to bring about an immediate reaction: this is the basic function of the laser warning detector.

Current operational detectors emit pulses of a width equal to a few nanoseconds. A laser warning detector generally consists of several optronic sensors. Each sensor is provided with an optical part coupled to a detector giving a current which is proportionate, at all instants, to the flux that it receives. Electronic processing enables the detection of the received flux as soon as the detected signal is above a pre-determined threshold. In terms of current, this amounts to a value of the detected current greater than a minimum value IS1 resulting from the comparison threshold value used for operation.

Each optronic channel is characterized by its field which is that part of space observed by the sensor and from where the light emissions are collected, by its sensitivity which is the minimum illumination value that can be detected at the input of the sensor, and by its false alarm rate which is the number of false detections per hour of operation when there is no light energy received at all.

The field and sensitivity are thus defined by the characteristics of the illuminators, the design constraints on the equipment and the carriers to be protected. These various characteristics lead to specifying a current threshold value IS1 which should not be exceeded.

The false alarm rate characterizes the reliability of the information given by the warning detector: the required value depends on the application (the task and the carrier) and may vary between 1 and 1/1000. The value 1/1000 corresponds to one false alarm per 1000 hours of operation for all the optronic channels. False alarm rate (abbreviated as FAR) requirements often lay down a detection threshold IS2 which is greater than the above-mentioned limit value IS1 and is therefore incompatible with the field and sensitivity specifications of the equipment.

The present invention provides, through a simple arrangement of the optronic channel, for the possibility of reducing the relationship between threshold IS and the false alarm rate FAR (curve C1 of FIG. 1 corresponding to a system not arranged according to the invention) to a magnitude compatible with the limit value IS1 (the curve C2 of FIG. 2 corresponding to a system arranged according to the invention).

False alarms can be produced by electro-magnetic sources external to the equipment (for example radio transmissions, radar or electrical arcs) or internal to the equipment (such as spurious phenomena produced by certain parts of the equipment). False alarms can also result from random noise sources due to the detector and to electronic processing. Thirdly, false alarms can result from signals created spontaneously in the detecting elements. These signals take the form of very brief pulses. They are filtered by the frequency response characteristic of the detector and appear, with respect to electronic processing, in the form of waves close to the pulses produced by the laser illuminators.

The effect of the electro-magnetic sources can be reduced through appropriate design (such as shielding, filtering, and the elimination of inconvenient couplings).

The random noise sources generally remain compatible with the maximum detection threshold IS1.

On the contrary, the spontaneous generation of pulses in the detector plays a preponderant role in subsequently determining the false alarm rate.

An object of the present invention is the application of a processing method which distinguishes pulse signals of light origin or useful signals from the spurious signals and especially from those created by the detectors themselves.

The discriminating of these spurious pulse signals by waveform recognition cannot be contemplated since the waveforms are close to those of the useful signals. The time interval differences to be observed, which are of the order of a few nanoseconds, imply the use of very complicated processing. Finally, although the spectrum of the laser pulses to be considered always appears to be limited by the detector, this experimental observation cannot be made into an absolute generalization because of the various types of materials and technologies on which the detectors are based.

An aim of the invention is to remove all these drawbacks by arranging the octronic channels of the equipment in a special way.

SUMMARY OF THE INVENTION

According to the invention, there is provided a system for the detection of light pulses comprising successively: optical means for the reception of laser radiation in a defined total field, said total field being covered by at least one receiving optical channel and being formed, when there are several optical channels, by juxtaposed elementary fields; means for the photodetection of the laser radiation received in the total field by the optical means; and means for processing the detected signals, said processing means making a comparison with a first selection of signals above a given threshold; wherein said photodetection means comprise, for each optical channel, a pair of detecting elements to form two detecting channels, and wherein the means for processing the signals detected by the photodetector elements can be used to lower the false alarm rate by subsequently selecting only those signals which are present simultaneously in both detecting channels of each pair considered.

BRIEF DESCRIPTION OF THE DRAWINGS

The specific features and advantages of the invention will appear in the following description, given by way of example and made with reference to the appended figures of which.

DESCRIPTION OF PREFERRED EMBODIMENTS

Figure 1:
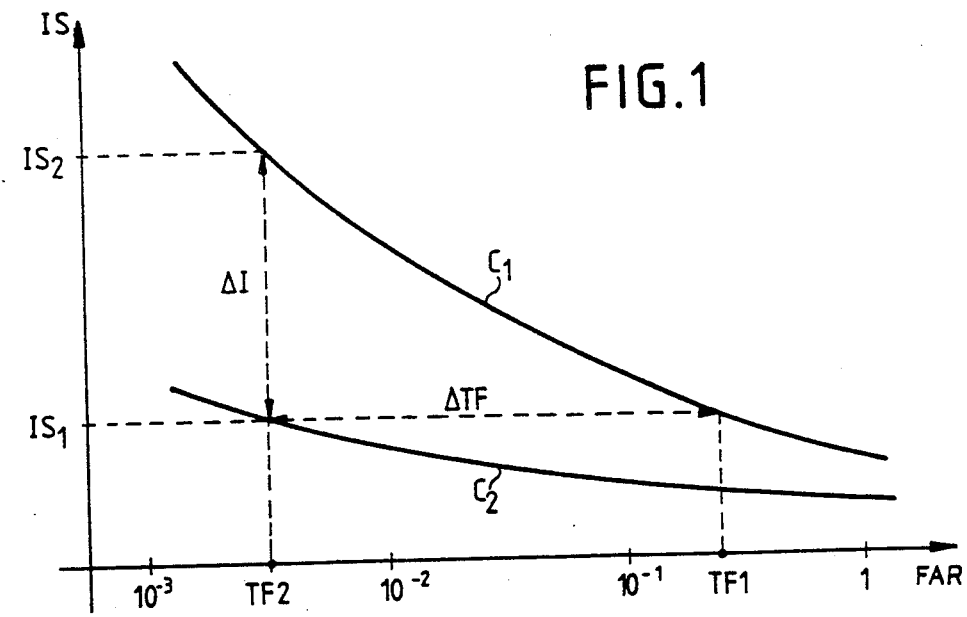
FIG. 1 shows curves of variation in the false alarm rate as a function of the threshold in a system without the arrangement according to the invention and in a system equipped according to the invention.

In FIG. 1, the curve C1, pertaining to a system without the arrangement according to the invention, shows a minimum false alarm rate TF1 for the threshold value IS1 limited for given field and sensitivity characteristics.

With the arrangements according to the invention, the curve 2 shows that, for one and the same threshold value, the false alarm rate goes from the value TF1 to the value TF2 and thus shows a major reduction. For example, for a threshold IS1 of 1.5 microamperes, the FAR goes from 10 to about 0.002 (1 per 500 H). The value TF2 would be obtained in the previous case (that of curve C1) for the threshold value IS2 considerably higher than IS1 and incompatible with the field and sensitivity characteristics considered.

Figure 2:
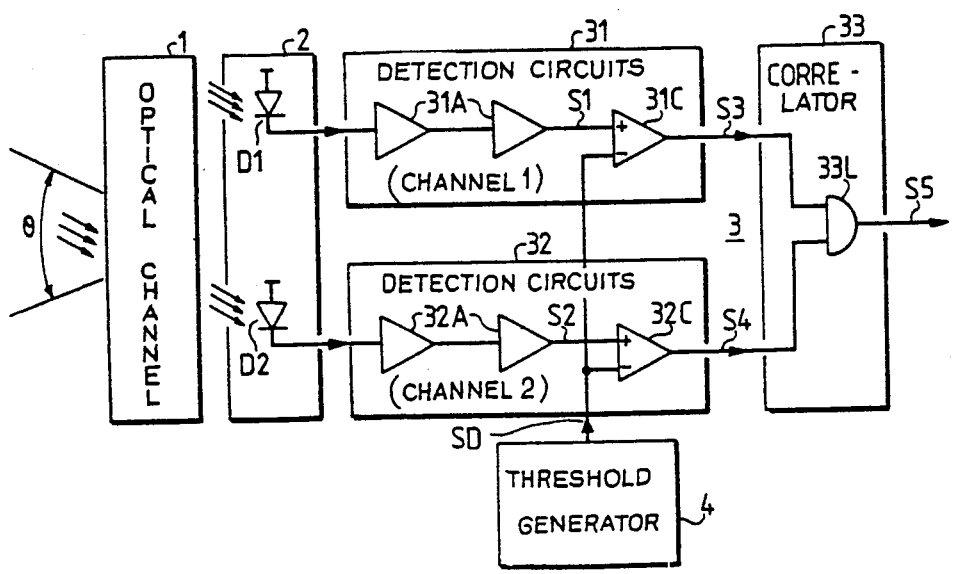
FIG. 2 is a block diagram of a light pulse detecting system according to the invention in its simplest version comprising a single optical channel.

The basic version is shown in FIG. 2 which shows a system with a single optical channel 1. This optical channel is made with a common optical element or with two similar optical elements to cover the same field $\theta$. With this reception optical channel 1, there is associated a detecting optical device 2 consisting of two detecting elements, a first detecting element D1 and a second detecting element D2, to form two detecting channels with the downline processing circuits 3. These processing circuits have detection circuits 31 for the channel 1 and 32 for the channel 2 to select detected signals which are above a given threshold SD, given by a threshold generator 4.

The signals S3 and S4, detected by the two channels, are correlated in a correlating circuit 33, the output S5 of which gives the useful detection signal.

Figure 3:
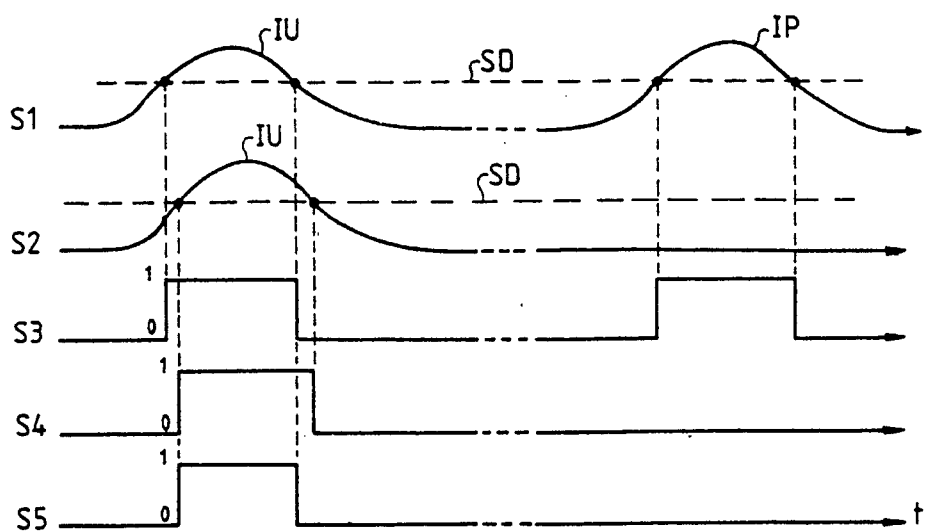
FIG. 3 shows waveforms of the main signals that come into play in the operation of the system according to FIG. 2.

As can be realized from the curves of FIG. 3, a useful signal appears at the correlation output S5 only if this signal is already present at the output S3 and S4 of the detection channels, thus making it possible to eliminate the spurious pulses created by the detectors themselves. For, as seen earlier, these spurious pulses IP have a form similar to that of the useful pulse IU but, on the contrary, the probability of their simultaneous appearance on both channels is almost nil. Consequently, they are eliminated by the final correlation function at 33.

Thus, the fact of adding a second detector D2 and a second detection channel 32 and of correlating the two detecting channels 31 and 32 enables the elimination of the inconvenient spurious pulses and considerably decreases the false alarm rate of the equipment.

The processing done makes it possible to detect expected laser or other radiation with a single channel D1-31. For, as soon as the photodetected current is higher than the threshold value on both channels, these channels, which are identical, perform simultaneous detections. The processing establishes a temporal correlation of the two pulses IU and then delivers a true detection signal S5. The processing can be used to eliminate any spurious pulse created in a detector. The appearance of these spurious signals is related to microelectronic phenomena proper to each detector. The moments at which they appear are therefore completely random and the probability of a simultaneous appearance of a signal of this type on both channels is practically nil. Finally, the proposed solution makes it possible to do away with the most inconvenient false alarm source and, hence, to obtain a reduced characteristic C2 as indicated in FIG. 1.

As shown, the detection channels have amplification circuits, 31A and 32A, and a threshold comparison circuit 31C and 32C. The amplification circuits may consist of a pre-amplifier in series with an amplifier. The pass-band of these circuits may go up to 40 MHz, for example, to detect laser pulses of a few nanoseconds. The comparators 31C and 32C are made with fast integrated technology and give a standardized output (waveform S3 and S4 of FIG. 3). Consequently, the correlation circuit 33 may simply consist of an "AND" logic gate 33. The detectors D1 and D2 are silicon detectors, for example. The detection system thus equipped can produce the correlation for peak current values greater than or equal to about 300 nanoamperes at each detector. The FAR obtained is easily smaller than 0.002. The pass-band chosen for the amplifiers is equal to the spectral band of the narrowest laser pulses to be received (of about 15 nanoseconds for example) and to the pass-band proper to the detector. The system thus shows maximum sensitivity and maximum efficiency of processing by correlation. The spurious pulses then have a minimum width, thus making it possible to reduce the real FAR. The invention can be applied especially to all laser warning applications comprising one or more octronic channels, said channels being capable of use for panoramic detection and, if necessary, for the location of incident laser pulses.

Figure 4:
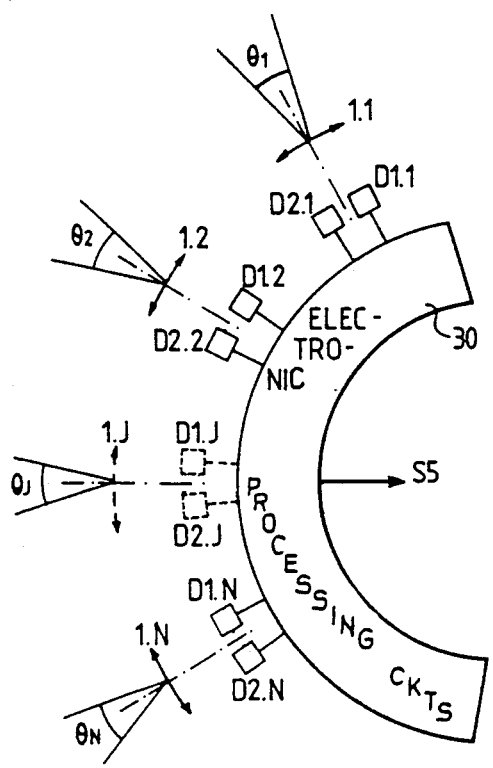
FIG. 4 is a general drawing showing the angular offset arrangement of several optical channels to provide a total field cover which can be used, for example, for panoramic or sectoral laser detection.

FIG. 4 recalls the configuration with several optical channels to cover the total field 0 in the form of successive elementary fields $\theta_1, \theta_2, \ldots \theta_J \ldots \theta_N$. Generally, the optical channels are identical and the elementary fields are equal, the optical axes being shifted by an increment $\theta/N$ from one axis to the next. This configuration is used, for example, to provide azimuth panoramic or sectoral cover in a laser warning detector device.

According to the invention, each of the channels has two detectors D1J and D2J for the channel J for example. The detectors are connected to the electronic processing set 3 which can be made in several forms, of which three possible embodiments shall be described below.

Figure 5:
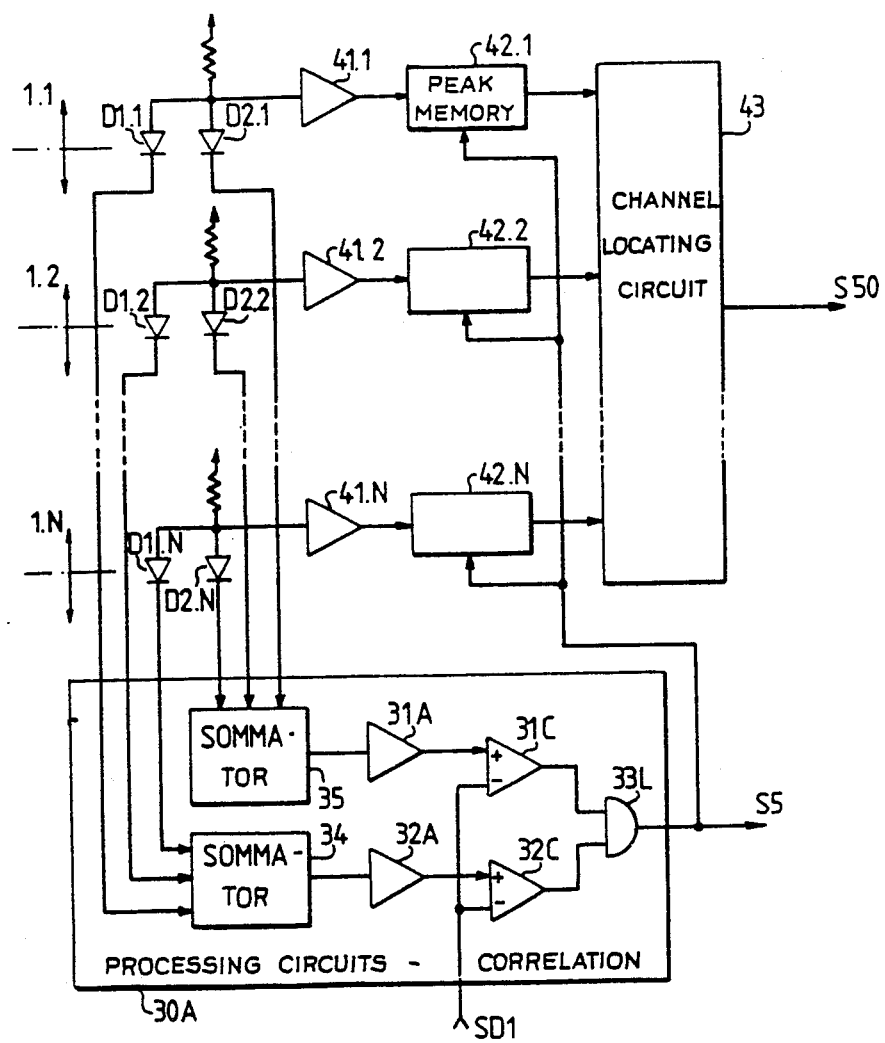
FIG. 5 shows a first embodiment of a detection system according to FIG. 4 and according to the invention.

According to the first embodiment shown in FIG. 5, the basic cell is in the processing circuit 30A with, in addition, two summation circuits 34 and 35: one receives the outputs of N detectors D1.1 to D1.N corresponding to the first detecting channel and the other summation circuit 35 receives the outputs of the second element of each pair of detectors, namely, the optical channel detectors D2.1 to D2.N. The output S5 really corresponds to the validated useful signal but does not give the channel information, namely the direction of the transmitter to within $\theta/N$, in this assembly. Consequently, the processing circuits are complemented by N detecting channels each coming from a pair of parallel-connected detectors. These N channels have the amplifiers 41.1 to 41.N. These amplifiers are followed by peak memory circuits 42.1 to 42.N controlled by the output of the validated useful signal S5, namely, the passage of this output to 1. Their content is transferred to a channel locating circuit 43 which selects the optronic channel in which the signal with the highest level is detected. The circuit 43 can be made in several known ways.

Figure 6:
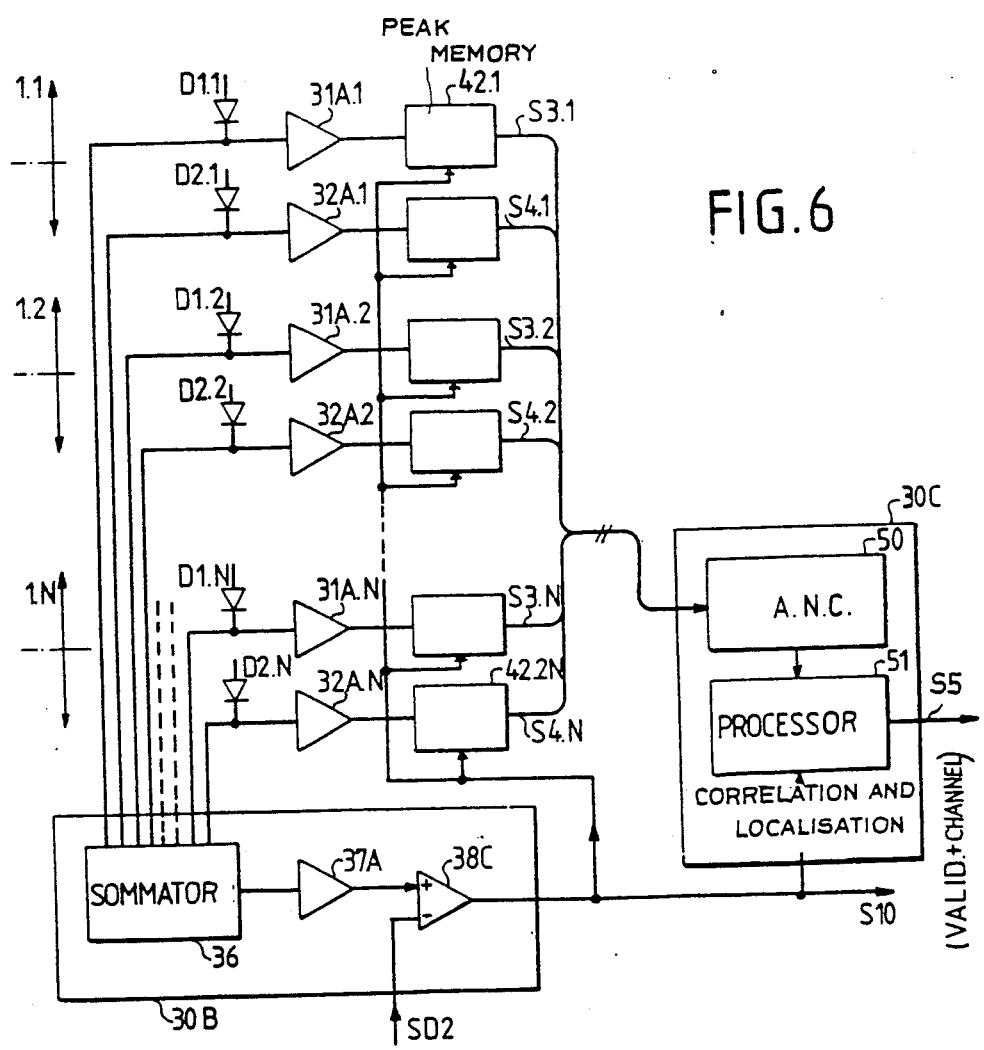
FIG. 6 shows a second embodiment of a detection system according to FIG. 4 and according to the invention.

According to the second embodiment shown in FIG. 6, the system has N optical channels and 2N detection channels. Each detection channel has the amplifiers 31A and 32A downline of the detectors. These amplifiers are followed by a peak memory circuit 42.1 to 42.2N. An electronic assembly 30B comprises a summation circuit 36, powered by the 2N outputs of the detectors and series-connected with an amplifier 37A, followed by a threshold comparator 38C. The signal S10 given by this assembly is applied firstly, to the peak memory circuit 42 and, secondly, to a unit 30C for processing by correlation according to the invention. In this processing unit, the signals S3.J and S4.J of each pair of detectors are correlated and give true detection when the signal is the useful signal present simultaneously at each detecting channel of the order J optical channel considered.

The processing circuit 30C may consist of a battery of correlators after the shaping of the signal or, preferably, as indicated, with a digital/analog converter circuit 50 followed by a processor 51 which performs the false alarm processing operations by correlation in comparing the signals S3.J and S4.J with each other for the N channels. It must be noted that the processor circuit can perform the locating processing operation at the same time since it has the information on the amplitude of the signal after the digital conversion at 50, and since it also has the information on the origin of the signal, namely, on the channel from which it comes. Consequently, in this embodiment, the output S5 validates the useful signal and may also comprise the information on the channel, namely the direction of the elementary $\theta J$ in which the detected signal is received.

Figure 7:
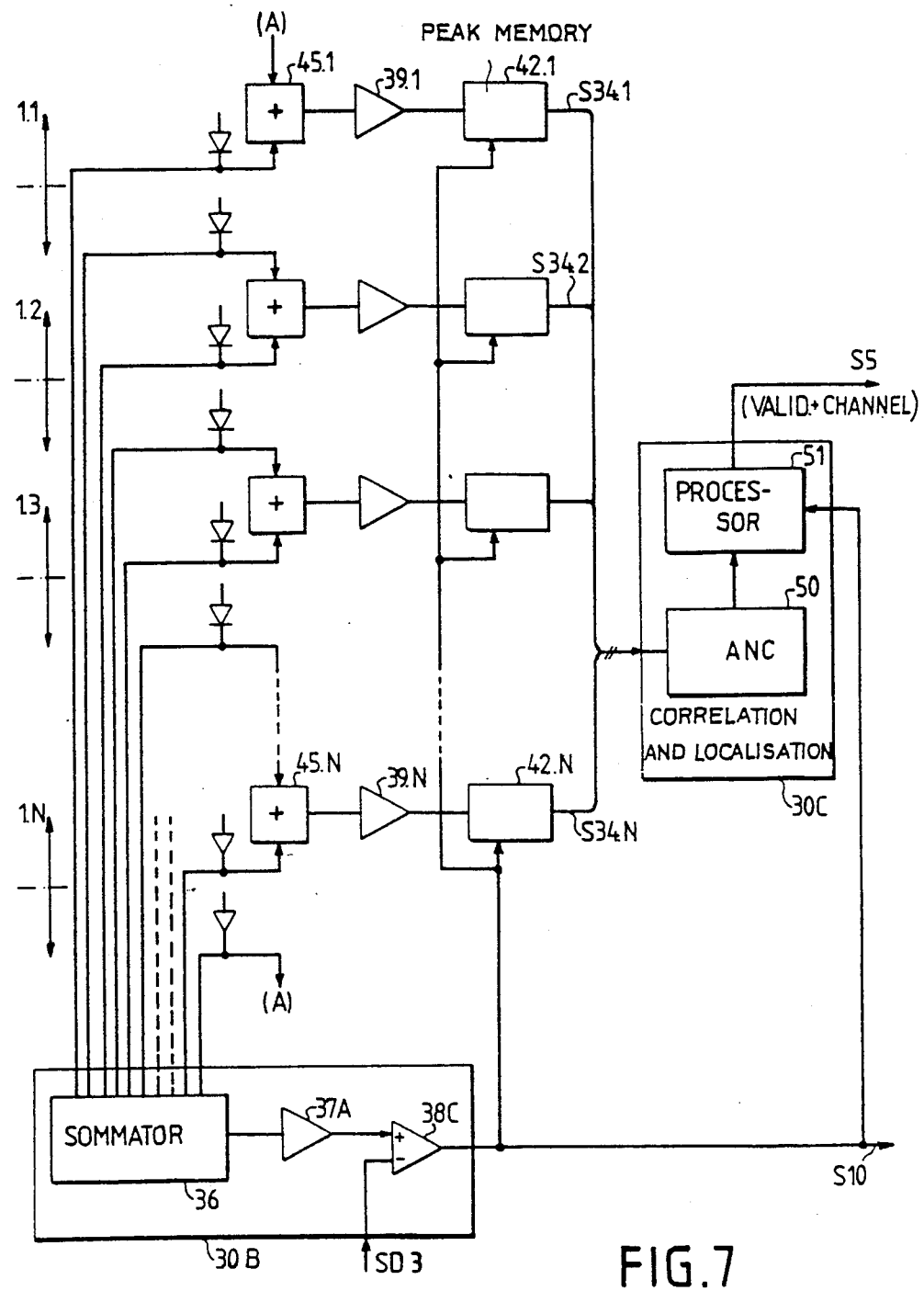
FIG. 7 shows a third embodiment of a detection system according to FIG. 4 and according to the invention.

According to a third embodiment of FIG. 7, an output signal S5 is also obtained here and comprises both the selection of the useful signal with the elimination of the spurious pulses and the information on the optical channel from which this signal comes. According to this embodiment, the number of amplifiers 39.1 to 39.N and the number of peak memory circuits 42.1 to 42.N is equal to N and is therefore divided by 2, thus increasing the compactness of the equipment. The N detecting channels originate, as shown, from a pair of detecting elements, but one of them relates to an optical channel 1.J and the other relates to the following optical channel 1.(J+1). This is got with the summation circuits 45.1 and 45.N. The detected outputs S34.1 to S34.N are applied, as previously, to a circuit 30C for processing by correlation.

The embodiment of FIG. 6, compared with that of FIG. 5, has the advantage of not being critical for the coupling between channels. On the contrary, it is more complicated if the number of channels N is great. For the last two embodiments according to FIGS. 6 and 7, it may be worthwhile to use 2 detectors integrated in the same package, for example, a two-cell package, for each channel.

The last embodiment shown in FIG. 7 which is simpler, is more compact and is the preferred version.

We claim:

1. A system for detection of light pulses comprising:
   optical means for receiving light pulse radiation in a defined total field, wherein said total field is one which is covered by at least one receiving optical channel and being formed, when there are several optical channels, by juxtaposed elementary fields;
   photodetection means for the photodetecting said light pulse radiation received in the total field by the optical means, said photodetection means comprising, for each optical channel, at least two detecting elements each forming a respective detecting channel, means for determining signals above a given threshold as detected signals, and means for processing the detected signals to produce a subsequent selection, for each pair of detecting elements, only for signals which are present simultaneously on the two corresponding detecting channels.

2. A system according to claim 1 wherein said subsequent selection is produced by correlation, said processing means comprising means for comparing with a threshold followed by correlation means.

3. A system according to claim 2 wherein the correlation means consist of an AND logic gate circuit receiving the outputs of two detecting channels after comparison with the threshold and validating the detection of a useful signal.

4. A system according to claim 2 wherein the correlation means consist of an analog/digital converter circuit and a processor circuit to process the digital data obtained and to produce the said selections.

5. A system according to claim 2 comprising N optical channels and 2N detectors, a first detector of each pair of detectors being connected to a first summation circuit, the second detector of each pair of detectors being detected at a second summation circuit, the outputs of the two summation circuits being connected to said threshold comparison circuits of said correlation circuit, the detectors of each pair being connected in parallel to additionally form N detecting cannels each comprising a peak memory circuit controlled by the output of the correlation circuit and connected to a circuit for the location of the channel which receives the maximum flux.

6. A system according to claim 2 comprising N optical channels and 2N detectors to form 2N detecting channels, each having a peak memory circuit connected to said correlation circuit, said detectors being also connected to a summation circuit followed by said threshold comparator circuit, the output of which is transmitted to the peak memory circuit and to the correlation circuit.

7. A system according to claim 4 comprising N optical channels and 2N detectors to form 2N detecting channels, each having a peak memory circuit connected to said correlation circuit, said detectors being also connected to a summation circuit followed by said threshold comparator circuit, the output of which is transmitted to the peak memory circuit and to the correlation circuit.

8. A system according to claim 2 comprising N optical channels and 2N detectors, the second detector of an optical channel and the first detector of the next channel being connected to a summation circuit to produce N detecting channels each having a peak memory circuit connected to said correlation channel, said detectors being furthermore connected to a summation circuit followed by said threshold comparator circuit, the output of which is transmitted to the peak memory circuits and to the correlation circuit.

9. A system according to claim 4 comprising N optical channels and 2N detectors, the second detector of an optical channel and the first detector of the next channel being connected to a summation circuit to produce N detecting channels each having a peak memory circuit connected to said correlation channel, said detectors being furthermore connected to a summation circuit followed by said threshold comparator circuit, the output of which is transmitted to the peak memory circuits and to the correlation circuit.

10. A system according to claim 4 wherein the correlation circuit also gives the location of the channels that have received the maximum flow.

11. A system according to claim 7 wherein the correlation circuit also gives the location of the channels that have received the maximum flow.

12. A system according to claim 9 wherein the correlation circuit also gives the location of the channels that have received the maximum flow.

13. A system according to claim 1 wherein the value of the current detected by the detectors may exceed 300 nanoamperes to detect pulses with a minimum time interval value at mid-height of about 15 nanoseconds and to obtain a false alarm rate below 0.002.

14. A system according to claim 1 used for the warning detection of pulse laser illuminators.

* * * * *